(12) United States Patent
Vincent et al.

(10) Patent No.: US 10,290,874 B2
(45) Date of Patent: May 14, 2019

(54) METHOD FOR ATTACHMENT BETWEEN A METAL COLLECTOR AND A CARBON FELT OF A BATTERY AND BATTERY PRODUCED BY THE METHOD

(71) Applicant: Commissariat a l'Energie Atomique et aux Energies Alternatives, Paris (FR)

(72) Inventors: Rémi Vincent, Grenoble (FR); Benoît Chavillon, Grenoble (FR); Eric Mayousse, Grenoble (FR); Maxime Schroder, Buironfosse (FR)

(73) Assignee: Commissariat a l'Energie Atomique et aux Energies Alternatives (FR)

( * ) Notice: Subject to any disclaimer, the term of this patent is extended or adjusted under 35 U.S.C. 154(b) by 0 days.

(21) Appl. No.: 15/756,019

(22) PCT Filed: Sep. 16, 2016

(86) PCT No.: PCT/FR2016/052347
§ 371 (c)(1),
(2) Date: Feb. 27, 2018

(87) PCT Pub. No.: WO2017/055705
PCT Pub. Date: Apr. 6, 2017

(65) Prior Publication Data
US 2018/0248196 A1 Aug. 30, 2018

(30) Foreign Application Priority Data
Sep. 28, 2015 (FR) ..................................... 15 59097

(51) Int. Cl.
*H01M 4/66* (2006.01)
*H01M 4/133* (2010.01)
(Continued)

(52) U.S. Cl.
CPC ........... *H01M 4/661* (2013.01); *H01M 4/133* (2013.01); *H01M 4/1393* (2013.01);
(Continued)

(58) Field of Classification Search
CPC .. H01M 4/661; H01M 4/625; H01M 10/0525; H01M 4/133; H01M 4/622;
(Continued)

(56) References Cited

U.S. PATENT DOCUMENTS

2003/0010809 A1* 1/2003 Lewandowski ........ B23K 10/02
228/122.1
2007/0234537 A1* 10/2007 Chepurnaya ........... H01G 9/038
29/25.03

FOREIGN PATENT DOCUMENTS

KR 20120029289 3/2012
WO WO2004086542 A2 10/2004
WO WO2007112075 A2 10/2007

* cited by examiner

*Primary Examiner* — Muhammad S Siddiquee
(74) *Attorney, Agent, or Firm* — Forge IP, PLLC

(57) ABSTRACT

A method of attachment between a metal collector and a carbon felt of a battery includes the steps of impregnation of the pores of the carbon felt with a mixture of metal powder and of a binder, locally performed in at least one predetermined area of the carbon felt; and spot welding between the metal collector and the carbon felt impregnated with the metal powder, performed at the level of said at least one predetermined area.

12 Claims, 1 Drawing Sheet

(51) Int. Cl.
  *H01M 4/587* (2010.01)
  *H01M 10/0525* (2010.01)
  *H01M 4/1393* (2010.01)
  *H01M 4/62* (2006.01)
  *H01M 4/02* (2006.01)

(52) U.S. Cl.
  CPC ............ *H01M 4/587* (2013.01); *H01M 4/62* (2013.01); *H01M 4/622* (2013.01); *H01M 4/625* (2013.01); *H01M 10/0525* (2013.01); *H01M 2004/027* (2013.01); *H01M 2004/028* (2013.01)

(58) Field of Classification Search
  CPC ...... H01M 4/62; H01M 4/587; H01M 4/1393; H01M 2004/028; H01M 2004/027
  See application file for complete search history.

METHOD FOR ATTACHMENT BETWEEN A METAL COLLECTOR AND A CARBON FELT OF A BATTERY AND BATTERY PRODUCED BY THE METHOD

DOMAIN OF THE INVENTION

The invention relates to a method of attachment between a metal collector and a carbon felt of a battery. The invention also relates to a battery obtained by the attachment method.

The invention particularly advantageously applies to lithium, lithium-ion, lithium-sulfur batteries, as well as primary thionyl chloride cells.

BACKGROUND

A lithium-ion battery is an electrochemical generator which is capable of transforming stored chemical energy into electric energy by reversible exchange of lithium ions. A lithium-ion battery is conventionally formed of two electrodes having an electrolyte forming an electrochemical core arranged therebetween.

FIG. 1 illustrates a lithium-ion battery of the state of the art formed of a single electrochemical core. The electrochemical core is formed by a positive electrode 10, a negative electrode 11, and an electrolyte 12 separating the two electrodes 10-11. Preferably, positive electrode 10 is made of lithium cation insertion materials, such as cobalt dioxide or manganese. Negative electrode 11 is most often made of graphite carbon, of titanate, of metal lithium, or of silicon. Electrolyte 12 is formed of a polymer separator or microporous composite impregnated with electrolyte or catholyte allowing the migration of the lithium ion from positive electrode 10 to negative electrode 11 and conversely, thus generating the current between the two electrodes 10, 11.

The access to positive electrode 10 is provided by a first current collector 13 preferably made of aluminum. The access to negative electrode 11 is provided by a second current collector 14. Second current collector 14 is conventionally made of copper for a graphite carbon electrode 11, of aluminum for a titanate or stainless steel or nickel electrode 11 according to the battery type.

Eventually, layers 10-14 are integrated in a package 15 so that only a portion of collectors 13, 14 is accessible outside of package 15. Package 15 may be rigid or flexible and guarantees the tightness of the electrochemical core with respect to polluting outside elements such as water, oxygen, and nitrogen. Package 15 may be made in the form of a thermoformable pouch or a hard container made of stainless steel or of aluminum.

The lithium-ion battery of FIG. 1 is made in planar form by planar layers. As a variation, a lithium-ion battery may also be made in cylindrical form by concentric layers. The electrochemical core may also be made in spiral or prismatic form. Further, certain batteries are formed of a plurality of stacked electrochemical cores.

The new generation of batteries comprises positive electrodes formed by carbon fabrics or carbon felts. Indeed, carbon felt is a material enabling to efficiently insert the products of the electrochemical reaction into the pores of the carbon felt. However, since carbon felt is not a metallic element, the binding of the metal collector to the positive electrode cannot be performed by a conventional welding.

Document KR 2012 0029289 provides holding the carbon felt in a metal frame having the collector welded thereto. However, the frame increases the battery bulk and the method of holding the carbon felt on the frame is complex.

The aim of the invention is to simplify the bonding and the electric contact between a carbon felt and a metal collector of a battery.

SUMMARY OF THE SPECIFICATION

The invention provides impregnating the carbon felt with a mixture formed of a metal powder and performing a welding between the metal collector and the carbon felt impregnated with metallized mixture.

To achieve this, according to a first aspect, the invention relates to a method of attachment between a metal collector and a carbon felt of a battery, comprising the steps of:

impregnating the pores of the carbon felt with a mixture of metal powder and of a binder, spot welding between the metal collector and the carbon felt impregnated with the metal powder.

The impregnation step is performed locally in at least one predetermined area, and the spot welding step is carried out at the level of the at least one predetermined area.

The invention thus enables to obtain a resistant conductive mechanical connection between the metal collector and the carbon felt by joint melting of the metal of the mixture and of the metal collector.

The pores of the carbon felt are thus, on the one hand, used to store the components of the electrochemical reaction and, on the other hand, used to store the metal powder for the welding. Against all expectations, the incorporation of a local metal powder in the carbon felt does not alter the electrochemical reaction taking place in the electrode.

According to an embodiment, the metal powder is made of the same material as the metal collector. This embodiment enables to improve the bonding between the metal collector and the carbon felt.

According to an embodiment, the metal powder is mostly made of aluminum, of stainless steel, of nickel, or of copper. This embodiment enables to define the metal powder according to the battery chemistry. Indeed, a lithium-ion battery will preferably use an aluminum metal powder while a lithium-sulfur battery may use a stainless steel metal powder. Similarly, other batteries may use nickel or copper metal powders according to the electrolytes used.

According to an embodiment, the binder is mostly formed of rosin. Rosin enables to decrease the surface tension of molten metals. Rosin thus enables molten metals to more easily flow to rapidly and efficiently cover welded surfaces. While oxide layers may permanently form on the heated surfaces during a welding, rosin enables to dissolve such oxide layers.

According to an embodiment, the binder is mostly made of carboxymethylcellulose (CMC), of polytetrafluoroethylene (PTFE), or of polyvinylidene fluoride (PVDF).

According to an embodiment, the size of the metal particles of the metal powder is smaller than 1 micrometer, preferably in the range from 200 nanometers to 1,000 nanometers.

According to an embodiment, the pore size of the carbon felt is in the range from 10 micrometers to 100 micrometers. This embodiment enables to obtain a factor ten between the pore size of the carbon felt and the size of the metal particles, thus ensuring a good impregnation of the carbon felt.

According to an embodiment, the at least one predetermined area forms a circle having a diameter in the range from 1 millimeter to 3 millimeters.

According to an embodiment, the mixture comprises from 20% to 60% by weight of binder, preferably the mixture comprises 40% of binder and 60% of metal powder.

According to a second aspect, the invention relates to a battery comprising:
- a positive electrode,
- a negative electrode,
- an electrolyte separating the two electrodes,
- a first current collector electrically connected to the positive electrode, and
- a second current collector electrically connected to the negative electrode.

The positive electrode is formed of a carbon felt and the first current collector is attached to the positive electrode by means of the attachment method according to the first aspect of the invention.

The invention and the resulting advantages will better appear from the following non-limiting drawings and examples, provided as an illustration of the invention.

EMBODIMENTS OF THE SPECIFICATION

Figure 1:
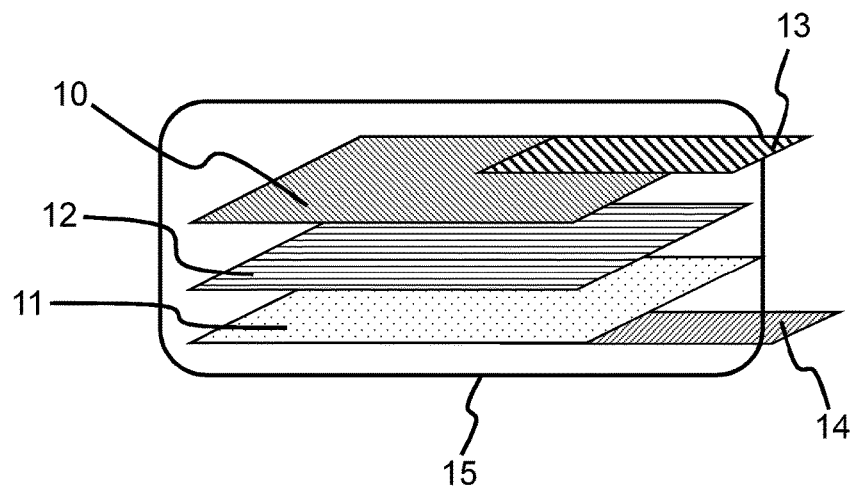
FIG. 1 illustrates a lithium-ion battery of the state of the art.
Figure 2:
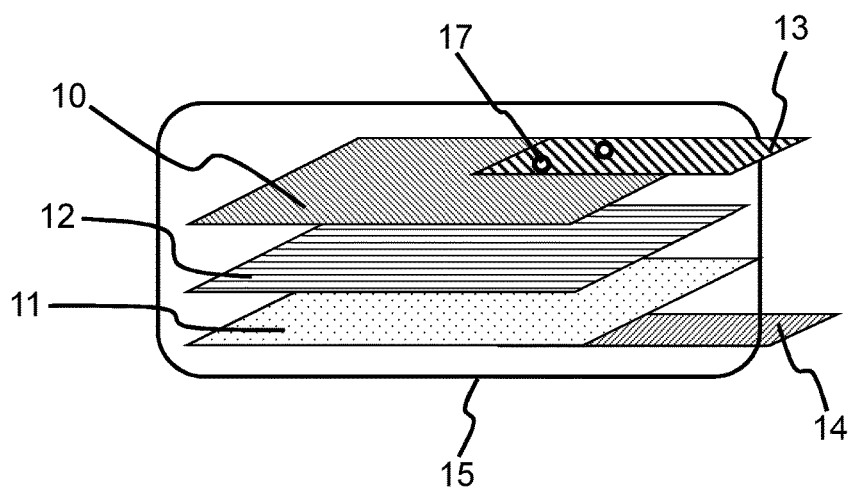
FIG. 2 illustrates a battery according to an embodiment of the invention.

FIG. 2 illustrates a battery formed of a single electrochemical core. The electrochemical core is formed by a positive electrode 10, a negative electrode 11, and an electrolyte 12 separating the two electrodes 10-11. Preferably, positive electrode 10 is made of materials such as cobalt dioxide or manganese. Negative electrode 11 is most often made of graphite carbon, of titanate, of metal lithium, or of silicon. Electrolyte 12 is formed of a polymer separator or microporous composite impregnated with electrolyte or catholyte allowing the migration of ions from positive electrode 10 to negative electrode 11 and conversely, thus generating the current between the two electrodes 10, 11.

The access to positive electrode 10 is provided by a first current collector 13 preferably made of aluminum. The access to negative electrode 11 is provided by a second current collector 14. Second current collector 14 is conventionally made of copper for a negative graphite carbon electrode 11, of aluminum for a negative titanate or stainless steel or nickel electrode 11 according to the battery type.

Eventually, layers 10-14 are integrated in a package 15 so that only a portion of collectors 13, 14 is accessible outside of package 15. Package 15 may be rigid or flexible and guarantees the tightness of the electrochemical core with respect to polluting outside elements such as water, oxygen, and nitrogen. Package 15 may be made in the form of a thermoformable pouch or a hard container made of stainless steel or of aluminum.

The battery of FIG. 2 is made in planar form by planar layers. As a variation, the battery may also be made in cylindrical form by concentric layers. The electrochemical core may also be made in spiral or prismatic form. Further, the battery may be formed of a plurality of stacked electrochemical cores.

The invention relates to the attachment between positive electrode 10 and first current collector 13, said positive electrode 10 being formed by a carbon felt.

The invention comprises impregnating the carbon felt forming positive electrode 10 with a mixture of metal powder and of a binder. The impregnation is local, at the level of a predetermined area 17 to form the welding between metal collector 13 and the carbon felt. Thus, the implementation of a standard spot welding system enables to locally melt collector 13 and the metal powder impregnated in carbon felt 10. Thereby, a mechanically resistant conductive layer is obtained between collector 13 and carbon felt 10.

The spot welding corresponds to a well known process performed by the combination of a strong electric intensity and a point pressure. This method requires no external provision of material. The electric intensity heats the material up to the melting point. The pressure maintains the contact between the welding electrode and the assembly. For the welding, a clip presses the assembly against caps or electrodes made of copper, which material is a good conductor of electricity and heat, which enables to heat less the contacting area with the clip and to avoid the melting thereof, which is limited to the contacting area between the two sheets to be welded: predetermined area 17. This technique is thus dependent on the resistivity (electric resistance) of the materials, on the total thickness of the assembly, and on the diameter of the welding electrodes. The impregnation is performed with printing systems of silk-screening, spray, inkjet, flexography, etc., type. Since carbon fabrics are porous, ink easily penetrates.

The metal powder used will be defined according to the battery chemistry. For example, lithium-ion batteries will use aluminum and lithium-sulfur batteries may use stainless steel, other batteries may use nickel or copper according to the electrolytes 12 used. Generally, the metal powder added to carbon felt 10 will be of same nature as collector 13, but not necessarily.

Similarly, the binder of the impregnation ink is mainly identified according to the battery chemistry. If rosin in compatible, it will be preferred since it enables to play the role of a flux during the welding. Rosin is used to decrease the surface tension of molten metals and enables them to flow more easily to more rapidly and efficiently cover the surface of the portions to be soldered. While oxide layers permanently form on the heated surfaces during a welding, rosin is used to dissolve and remove such oxide layers.

As a variation, other binders may also be used (carboxymethylcellulose (CMC), of polytetrafluoroethylene (PTFE), or of polyvinylidene fluoride (PVDF)).

Although the mixture preferably used corresponds to 40% of rosin and 60% of metal powder by weight, the rosin ratios may vary from 20 to 60%.

The size of the metal particles used is preferably smaller than 1 micrometer, and advantageously in the range from 200 nanometers to 1,000 nanometers.

The pore size of carbon felt 10 is preferably in the range from 10 micrometers to 100 micrometers. Thus, a factor ten between the particle size and the pore size of carbon felt 10 provides a good impregnation.

Predetermined area 17 has a substantially circular shape, preferably with a diameter in the range from 1 millimeter to 3 millimeters.

FIG. 2 illustrates two predetermined areas 17 enabling to provide a reliable binding between collector 13 and carbon felt 10. As a variation, the number of predetermined areas 17 and thus the number of welds may vary.

The invention thus enables to obtain a strong conductive bonding between metal collector 13 and carbon felt 10 without altering the electrolyte used for the batteries.

The invention particularly applies for lithium, lithium-ion batteries. The invention may also be implemented for lithium-sulfur batteries as well as primary thionyl chloride cells since the carbon felt enables to insert the reaction residues.

The invention claimed is:

1. A method of attachment between a metal collector and a carbon felt of a battery, comprising the steps of:
   impregnating the pores of the carbon felt with a mixture of metal powder and of a binder, and
   spot welding between the metal collector and the carbon felt impregnated with the metal powder,
   the impregnating step being locally carried out in at least one predetermined area of the carbon felt, and
   the spot welding step being carried out at a level of said at least one predetermined area.

2. The method of claim 1, wherein the metal powder is made of the same material as the metal collector.

3. The method of claim 1, wherein the metal powder is mostly made of aluminum, of stainless steel, of nickel, or of copper.

4. The method of claim 1, wherein the binder is mostly made of rosin.

5. The method of claim 1, wherein the binder is mostly made of carboxymethylcellulose (CMC), of polytetrafluoroethylene (PTFE), or of polyvinylidene fluoride (PVDF).

6. The method of claim 1, wherein a size of the metal particles of the metal powder is smaller than 1 micrometer.

7. The method of claim 1, wherein the size of the carbon felt pores is in the range from 10 micrometers to 100 micrometers.

8. The method of claim 1, wherein said at least one predetermined area forms a circle having a diameter in the range from 1 millimeter to 3 millimeters.

9. The method of claim 1, wherein the mixture comprises from 20% to 60% by weight of binder.

10. A battery comprising:
    a positive electrode formed of a carbon felt locally impregnated with a mixture of metal powder and of a binder in at least one predetermined area of the carbon felt;
    a negative electrode,
    an electrolyte separating the two electrodes,
    a first current collector electrically connected to the positive electrode,
    a second current collector electrically connected to the negative electrode, and
    a spot weld attaching the first current collector to the positive electrode at a level of said at least one predetermined area.

11. The method of claim 6, wherein the size of the metal particles of the metal powder is in the range from 200 nanometers to 1,000 nanometers.

12. The method of claim 9, wherein the mixture comprises 40% of binder and 60% of metal powder.

* * * * *